US011945233B2

(12) United States Patent
Matsusaki et al.

(10) Patent No.: US 11,945,233 B2
(45) Date of Patent: Apr. 2, 2024

(54) THERMAL HEAD AND THERMAL PRINTER

(71) Applicant: KYOCERA CORPORATION, Kyoto (JP)

(72) Inventors: Yuuki Matsusaki, Kirishima (JP); Kenji Terada, Kirishima (JP)

(73) Assignee: KYOCERA CORPORATION, Kyoto (JP)

( * ) Notice: Subject to any disclaimer, the term of this patent is extended or adjusted under 35 U.S.C. 154(b) by 315 days.

(21) Appl. No.: 17/442,138

(22) PCT Filed: Mar. 19, 2020

(86) PCT No.: PCT/JP2020/012539

§ 371 (c)(1),
(2) Date: Sep. 23, 2021

(87) PCT Pub. No.: WO2020/196349

PCT Pub. Date: Oct. 1, 2020

(65) Prior Publication Data

US 2022/0169038 A1 Jun. 2, 2022

(30) Foreign Application Priority Data

Mar. 26, 2019 (JP) ................................ 2019-058661

(51) Int. Cl.
*B41J 2/335* (2006.01)

(52) U.S. Cl.
CPC ......... *B41J 2/3351* (2013.01); *B41J 2/33515* (2013.01); *B41J 2/33535* (2013.01); *B41J 2/3354* (2013.01); *B41J 2/3357* (2013.01)

(58) Field of Classification Search
CPC .. B41J 2/3351; B41J 2/33515; B41J 2/33535; B41J 2/3354; B41J 2/3357
See application file for complete search history.

(56) References Cited

U.S. PATENT DOCUMENTS

2006/0033782 A1* 2/2006 Sakai .................. B41J 2/14072
347/64

FOREIGN PATENT DOCUMENTS

| | | | | |
|---|---|---|---|---|
| JP | 60259467 A | * 12/1985 | | B41J 3/20 |
| JP | S60259467 A | 12/1985 | | |
| JP | H422244 U | 2/1992 | | |
| JP | 201328136 A | 2/2013 | | |
| JP | 2013028136 A | * 2/2013 | | B41J 2/345 |

* cited by examiner

*Primary Examiner* — Yaovi M Ameh
(74) *Attorney, Agent, or Firm* — HAUPTMAN HAM, LLP

(57) ABSTRACT

A thermal head according to the present disclosure includes a substrate, a plurality of heat generating portions, a plurality of first electrodes, and a second electrode. The plurality of heat generating portions are located on the substrate. The plurality of first electrodes are located on the substrate and respectively connected to the plurality of heat generating portions. The second electrode is located on the substrate and is located across the plurality of first electrodes. The second electrode includes protruding portions protruding in a first direction from the second electrode toward corresponding ones of the first electrodes and being in contact with the corresponding ones of the first electrodes.

17 Claims, 8 Drawing Sheets

THERMAL HEAD AND THERMAL PRINTER

RELATED APPLICATIONS

The present application is a National Phase of International Application Number PCT/JP2020/012539, filed Mar. 19, 2020, and claims priority based on Japanese Patent Application No. 2019-058661, filed Mar. 26, 2019.

TECHNICAL FIELD

The present invention relates to a thermal head and a thermal printer.

BACKGROUND ART

Conventionally, various thermal heads have been proposed as printing devices such as facsimile machines and video printers. For example, a thermal head including a substrate, a plurality of heat generating portions, a plurality of first electrodes, and a second electrode is known. The plurality of heat generating portions are located on the substrate. The plurality of first electrodes are located on the substrate and connected to the plurality of heat generating portions, respectively. The second electrode is located on the substrate and located on the plurality of first electrodes (see Patent Document 1).

CITATION LIST

Patent Literature

Patent Document 1: JP 4-22244 Y

SUMMARY OF INVENTION

A thermal head according to an embodiment of the present invention includes a substrate, heat generating portions, a plurality of first electrodes, and a second electrode. A plurality of the heat generating portions are located on the substrate. The plurality of first electrodes are located on the substrate, and respectively connected to the plurality of heat generating portions. The second electrode is located on the substrate and located across the plurality of first electrodes. The second electrode includes protruding portions protruding in a first direction from the second electrode toward corresponding ones of the plurality of first electrodes and being in contact with the corresponding ones of the first electrodes.

A thermal printer according to an embodiment of the present invention includes the thermal head described above, a transport mechanism, and a platen roller. The transport mechanism transports a recording medium to allow the recording medium to pass over the heat generating portions. The platen roller presses the recording medium.

DESCRIPTION OF EMBODIMENTS

As a conventional thermal head, a thermal head including a plurality of first electrodes and a second electrode is known. The second electrode is located across the plurality of first electrodes in order to reduce the wiring resistance of the plurality of first electrodes.

However, there is a problem in that the wiring resistance of the plurality of first electrodes is still large, and, consequently, the efficiency of the thermal head is poor.

In a thermal head of the present disclosure, the second electrode includes protruding portions protruding in a first direction from the second electrode toward corresponding ones of the plurality of first electrodes and being in contact with the first electrodes. As a result, a contact surface area between each of the first electrodes and the second electrode can be increased by an amount corresponding to the protruding portion. In addition, the cross-sectional area of the entirety of the electrodes can be increased by an amount corresponding to the protruding portions. As a result, the wiring resistance of the thermal head is reduced, and the efficiency of the thermal head is improved.

Figure 1:
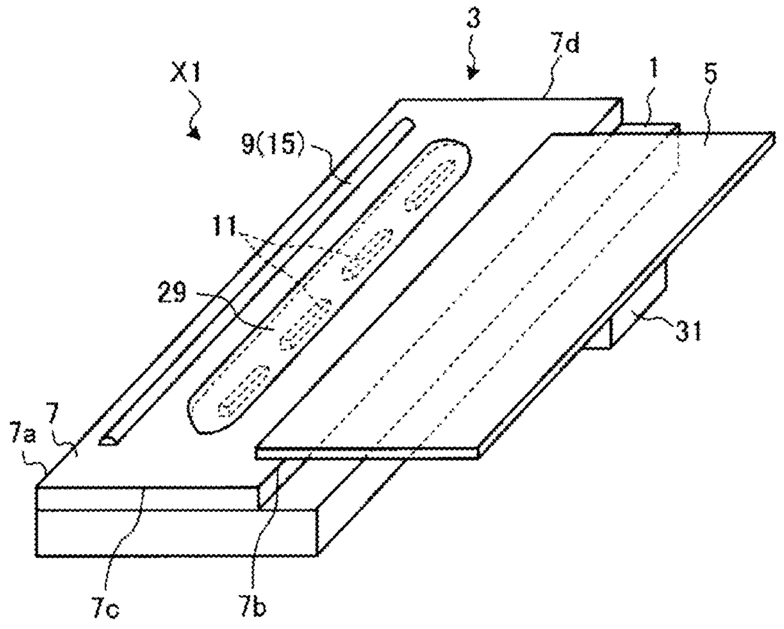
FIG. 1 is a perspective view schematically illustrating a thermal head.

The thermal head and the thermal printer according to the present disclosure will be described below with reference to FIGS. 1 to 5. FIG. 1 schematically illustrates the thermal head, in which a protective layer 25 and a cover layer 27 are omitted. FIG. 3 illustrates wiring of a head base 3 in a simplified manner, in which drive ICs 11, the protective layer 25, and the cover layer 27 are omitted. In FIG. 3, a configuration of second electrodes 14 is illustrated in a simplified manner.

A thermal head X1 includes a heat dissipation body 1, the head base 3, and a flexible printed circuit board 5 (hereinafter, referred to as FPC 5). The head base 3 is located on the heat dissipation body 1. The FPC 5 is electrically connected to the head base 3. The head base 3 includes a substrate 7, heat generating portions 9, the drive ICs 11, and a cover member 29.

The heat dissipation body 1 has a plate-like shape and has a rectangular shape in plan view. The heat dissipation body 1 has a function of dissipating, out of the heat generated by the heat generating portions 9 of the head base 3, heat that does not contribute to printing. The head base 3 is bonded to an upper surface of the heat dissipation body 1 by doublesided tape, adhesive, or the like (not illustrated). The heat dissipation body 1 is made of, for example, a metal material such as copper, iron, or aluminum.

The head base 3 has a plate-like shape and has a rectangular shape in plan view. In the head base 3, each member constituting the thermal head X1 is located on the substrate 7. The head base 3 performs printing on a recording medium (not illustrated) in accordance with an electrical signal supplied from the outside.

A plurality of the drive ICs 11 are located on the substrate 7, and are arranged in a main scanning direction (hereinafter, also referred to as a second direction D2). The drive ICs 11 have a function of controlling the energized state of the heat generating portions 9. A switching member including a plurality of switching elements inside may be used as each of the drive ICs 11.

The drive ICs 11 are covered by a cover member 29 made of a resin such as an epoxy resin or a silicone resin. The cover member 29 is located across the plurality of drive ICs 11.

One end of the FPC 5 is electrically connected to the head base 3, and the other end is electrically connected to a connector 31.

Figure 2:
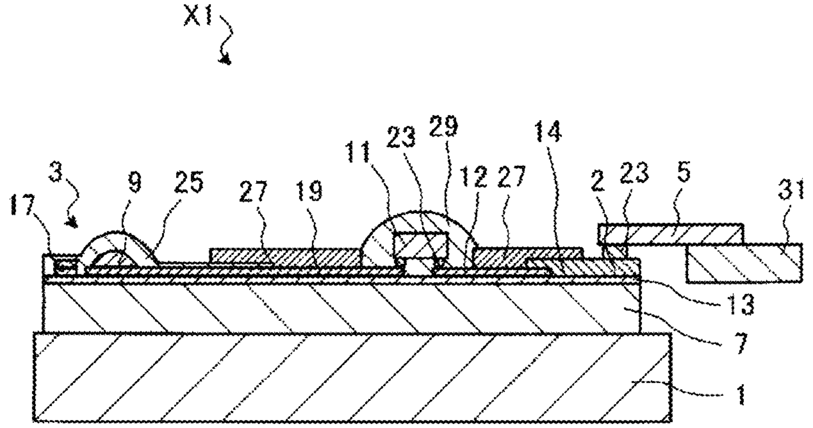
FIG. 2 is a cross-sectional view schematically illustrating the thermal head illustrated in FIG. 1.
Figure 3:
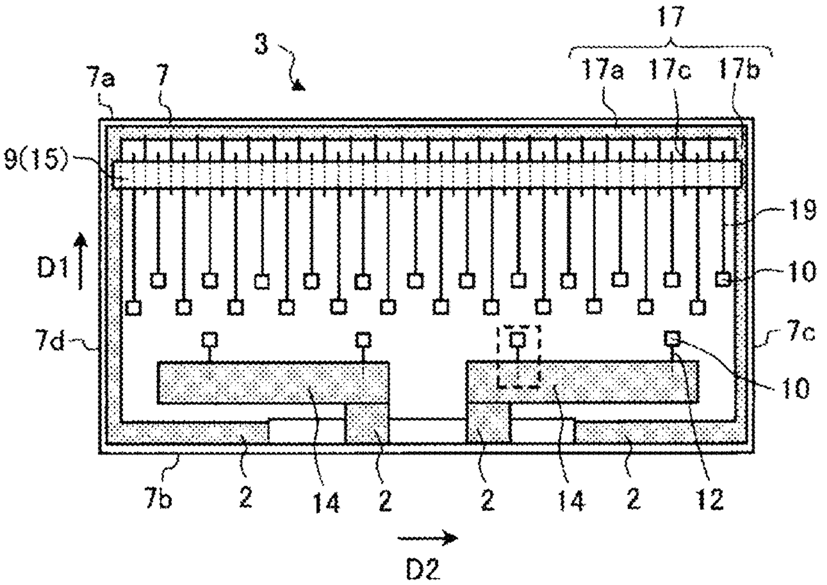
FIG. 3 is a plan view schematically illustrating a head base illustrated in FIG. 1.

The FPC 5 is electrically connected to the head base 3 by an electrically conductive bonding material 23 (see FIG. 2). An example of the electrically conductive bonding material 23 may include a solder material or an anisotropic conductive film (ACF) in which conductive particles are mixed in an electrically insulating resin.

Hereinafter, each member constituting the head base 3 will be described using FIGS. 1 to 3.

The substrate 7 has a rectangular shape in plan view, and has a first long side 7*a*, a second long side 7*b*, a first short side 7*c*, and a second short side 7*d*. The substrate 7 is made of an electrically insulating material such as an alumina ceramic or a semiconductor material such as monocrystalline silicon.

A heat storage layer 13 is formed over the entire surface of an upper surface of the substrate 7. The heat storage layer 13 is made of, for example, a glass having low thermal conductivity. The heat storage layer 13 temporarily accumulates a part of the heat generated by the heat generating portions 9, so that the time required to increase the temperature of the heat generating portions 9 can be shortened. This functions to enhance the thermal response properties of the thermal head X1.

The heat storage layer 13 is made by, for example, applying a predetermined glass paste obtained by mixing a glass powder with an appropriate organic solvent onto the upper surface of the substrate 7 by conventional well-known screen printing or the like, and firing the glass paste.

Note that the heat storage layer 13 may include an underlying portion and a raised portion. In this case, the underlying portion is located across the entire upper surface of the substrate 7. The raised portion protrudes from the underlining portion in the thickness direction of the substrate 7, and extends in a strip shape in the main scanning direction. In this case, the raised portion functions to favorably press the recording medium to be printed on against the protective layer 25 formed on the heat generating portions 9. Note that the heat storage layer 13 may include only the raised portion.

As illustrated in FIG. 2, a common electrode 17 and individual electrodes 19 are provided on an upper surface of the heat storage layer 13. The common electrode 17 and the individual electrodes 19 are made of an electrically conductive material, and examples thereof include a metal of any one of aluminum, gold, silver, and copper, or an alloy thereof.

As illustrated in FIG. 3, the common electrode 17 includes a first common electrode 17*a*, a plurality of second common electrodes 17*b*, a plurality of third common electrodes 17*c*, and a plurality of terminals 2. The common electrode 17 is electrically connected in common to the plurality of heat generating portions 9.

The first common electrode 17*a* is located between the first long side 7*a* on one side of the substrate 7 and the heat generating portions 9, and extends in the main scanning direction. The plurality of second common electrodes 17*b* are respectively located along the first short side 7*c* and the second short side 7*d* of the substrate 7. The plurality of second common electrodes 17*b* connect the respective terminals 2 to the first common electrode 17*a*. The plurality of third common electrodes 17*c* extend from the first common electrode 17*a* toward the heat generating portions 9, and parts of the third common electrodes 17*c* are inserted into the heat generating portions 9 to the opposite sides of the heat generating portions 9. The plurality of third common electrodes 17*c* are located at intervals from each other in the sub scanning direction (hereinafter, also referred to as a first direction D1).

The plurality of individual electrodes 19 are provided in the main scanning direction and are each located between corresponding adjacent ones of the third common electrodes 17*c*. As a result, in the thermal head X1, the plurality of third common electrodes 17*c* and the plurality of individual electrodes 19 are alternately aligned in the main scanning direction. Electrode pads 10 are connected to corresponding ones of the individual electrodes 19 on the second long side 7*b* side on the other side of the substrate 7. The electrode pads 10 are electrically connected to corresponding ones of the drive ICs 11 by the electrically conductive bonding material 23 (see FIG. 2).

First electrodes 12 are connected to corresponding ones of the electrode pads 10 and extend in the main scanning direction. The drive ICs 11 are mounted on corresponding ones of the electrode pads 10 as described above.

The second electrodes 14 extend in a sub scanning direction and are located across a plurality of the first electrodes 12. The second electrodes 14 are connected to the outside by corresponding ones of the terminals 2.

The terminals 2 are located on the second long side 7*b* side of the substrate 7. Each of the terminals 2 is connected to the FPC 5 by the electrically conductive bonding material 23 (see FIG. 2). In this way, the head base 3 is electrically connected to the outside.

The above-described third common electrode 17*c*, the individual electrodes 19, and the first electrodes 12 can be formed by sequentially layering material layers constituting the respective electrodes on the heat storage layer 13 by a conventional well-known thin film forming technique such as a sputtering method, for example, and then processing the laminate into a predetermined pattern by using conventional well-known photoetching or the like. Alternatively, for example, a screen printing method or the like may be used for production. The thickness of the third common electrode 17*c*, the individual electrodes 19, and the first electrodes 12 is approximately 0.3 to 10 μm.

The first common electrode 17*a*, the second common electrodes 17*b*, the second electrodes 14, and the terminals 2 described above can be formed with material layers constituting the respective members on the heat storage layer 13 by a screen printing method, as described above.

The thickness of the first common electrode 17*a*, the second common electrodes 17*b*, the second electrodes 14, and the terminals 2 is approximately 5 to 20 μm. By forming thick electrodes in this manner, the wiring resistance of the head base 3 can be reduced. Note that the portions of the thick electrodes are illustrated by dots in FIG. 3, and this similarly applies to the following drawings.

A heat generating resistor 15 is located across the third common electrodes 17*c* and the individual electrodes 19 and is spaced apart from the first long side 7*a* on one side of the substrate 7. Portions of the heat generating resistor 15 located between the third common electrodes 17*c* and the individual electrodes 19 function as the heat generating portions 9. The plurality of heat generating portions 9 are illustrated in a simplified manner in FIG. 3, but are disposed at a density of, for example, 100 dpi to 2400 dpi (dot per inch) or the like.

The heat generating resistor 15 may be formed in a long strip shape elongated in the main scanning direction by, for example, off-contact printing a material paste containing ruthenium oxide as a conductive constituent on the substrate 7 on which the various electrodes are patterned.

As illustrated in FIG. 2, the protective layer 25 is formed on the heat storage layer 13 formed on the upper surface of the substrate 7, and covers the heat generating portions 9. The protective layer 25 is provided from the first long side 7*a* on one side of the substrate 7 so as to be spaced apart from the electrode pads 10, and is provided entirely in the main scanning direction of the substrate 7.

The protective layer 25 has an insulating property and protects the covered region from corrosion due to deposition of moisture and the like contained in the atmosphere, or from wear due to contact with the recording medium to be printed on. The protective layer 25 can be made of, for example, a glass and is formed by a thick film forming technique such as printing.

The protective layer 25 may be formed using SiN, $SiO_2$, SiON, SiC, diamond-like carbon, or the like. Note that the protective layer 25 may be formed of a single layer or may be formed by layering a plurality of the protective layers 25. The protective layer 25 such as that described above can be formed using a thin film forming technique such as a sputtering method.

The cover layer 27 is disposed on the substrate 7 so as to partially cover the common electrode 17, the individual electrodes 19, the first electrodes 12, and the second electrodes 14. The cover layer 27 is for protecting the covered region from oxidation due to contact with the atmosphere or from corrosion due to deposition of moisture and the like contained in the atmosphere. The cover layer 27 can be formed of a resin material such as an epoxy resin, a polyimide resin, or a silicone resin.

Figure 4:
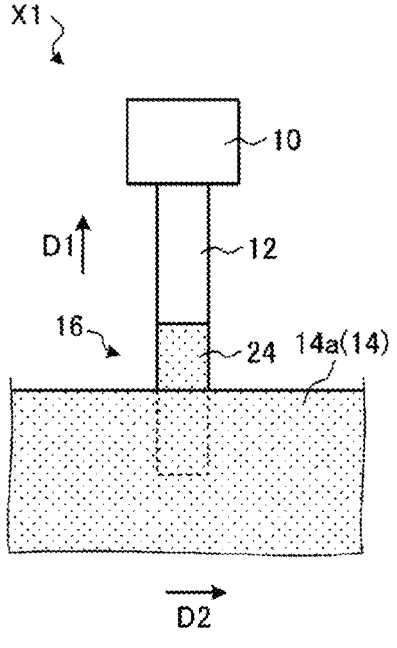
FIG. 4 is an enlarged plan view illustrating a dotted line portion illustrated in FIG. 3.

The first electrodes 12 and the second electrodes 14 will be described in detail using FIG. 4. FIG. 4 is an enlarged plan view illustrating a portion surrounded by dotted lines in FIG. 3.

The first electrode 12 is connected to the electrode pad 10 and the second electrode 14. The first electrode 12 extends from the electrode pad 10 in the first direction D1 (sub scanning direction). The first electrode 12 and the electrode pad 10 may be made of the same material or different materials. The thickness of the first electrode 12 is, for example, approximately 0.3 to 10 μm. Such a thickness allows for fine patterning. In addition, heat of the heat generating portions 9 is less likely to dissipate. Note that the electrode pad 10 and the first electrode 12 may be simultaneously formed from the same material.

The second electrode 14 includes a first section 14*a* and a protruding portion 16. As illustrated in FIG. 3, the first section 14*a* extends in the second direction D2 (main scanning direction) and is located across the plurality of first electrodes 12. In other words, the first section 14*a* is located over the plurality of first electrodes 12. The first section 14*a* is connected to the terminals 2. Accordingly, the second electrodes 14, the first electrodes 12, and thus the drive ICs 11 are electrically connected to the outside. More specifically, the second electrodes 14 are connected to an external ground potential. As a result, the heat generating portions 9 are connected to the ground potential.

The second electrodes 14 have a thickness of approximately 5 to 20 μm, and can be formed, for example, on the substrate 7, on which the first electrodes 12 have been patterned, using screen printing. In this case, the common electrode 17, the second electrodes 14, and the terminals 2 may be simultaneously formed using a mask having openings in the dotted regions illustrated in FIG. 3. At this time, by using a mask having openings in the regions where the protruding portions 16 are to be located, the protruding portions 16 can also be simultaneously formed.

As illustrated in FIG. 4, the protruding portion 16 protrudes in the first direction D1 (sub scanning direction) from the first section 14*a* of the second electrode 14 toward the first electrode 12. The protruding portion 16 is in contact with the first electrode 12. In other words, the protruding portion 16 protrudes from the first section 14*a* and is located on the first electrode 12 in plan view. More specifically, the protruding portion 16 extends, on the first electrode 12, from the first section 14*a* toward the heat generating portion 9 (see FIG. 3) side, and the width (length in the main scanning direction) of the protruding portion 16 is approximately equal to the width (length in the main scanning direction) of the first electrode 12.

Here, the second electrode 14 is located so that a portion of the second electrode 14 overlaps with the first electrode 12, and thus the first electrode 12 and the second electrode 14 are electrically connected. In recent years, there has been a demand for decreasing the size of the thermal head X1, and the width of the first electrodes 12 has also been reduced accordingly.

In response to the above, in the thermal head X1, the second electrodes 14 include the protruding portions 16 protruding from the second electrodes 14 in the first direction D1 and being in contact with corresponding ones of the first electrodes 12. As a result, the contact surface area between the first electrodes 12 and the second electrodes 14 is increased by an amount corresponding to the protruding portions 16. Furthermore, the cross-sectional area of the entirety of the electrodes is increased by an amount corresponding to the protruding portions 16. As a result, the wiring resistance of the thermal head X1 is reduced and the efficiency of the thermal head X1 is improved.

In order to suppress heat dissipation of the heat generating portions 9, the thermal efficiency of the thermal head X1 may be improved by reducing the thickness of the first electrodes 12. At this time, the cross-sectional area of the first electrodes 12 is reduced and the wiring resistance of the first electrodes 12 may become large. As a result, there is a problem in that the thermal head X1 is inefficient.

In response to the above, in the thermal head X1, the second electrode 14 includes the protruding portions 16 protruding from the second electrode 14 in the first direction D1 and being in contact with corresponding ones of the first electrodes 12. As a result, the wiring resistance of the first electrodes 12 can be reduced while heat dissipation from the first electrodes 12 is suppressed.

The thermal head X1 further includes the drive ICs 11 that control the driving of the plurality of heat generating portions 9, and a cover member 29 that covers the drive ICs 11, and each of the plurality of first electrodes 12 is connected to a corresponding one of the drive ICs 11, and the end portion of a corresponding one of the protruding portions 16 may be spaced apart from the drive IC 11 in plan view. In other words, the protruding portion 16 need not necessarily overlap with the drive IC 11 in plan view.

According to such a configuration, when the drive ICs 11 are mounted on the electrode pads 10 and the cover member 29 is applied, the cover member 29 is guided below the drive ICs 11 by the protruding portions 16. As a result, the cover member 29 is located below the drive ICs 11, and the contact surface area between the drive ICs 11 and the cover member 29 is increased. Thus, the bonding strength between the drive ICs 11 and the cover member 29 is increased, resulting in the thermal head X1 with improved robustness.

Note that the protruding portions 16 are a part of the second electrode 14 and protrude from the first section 14*a* toward the heat generating portions 9 (see FIG. 3).

Next, a thermal printer Z1 will be described with reference to FIG. 5.

Figure 5:
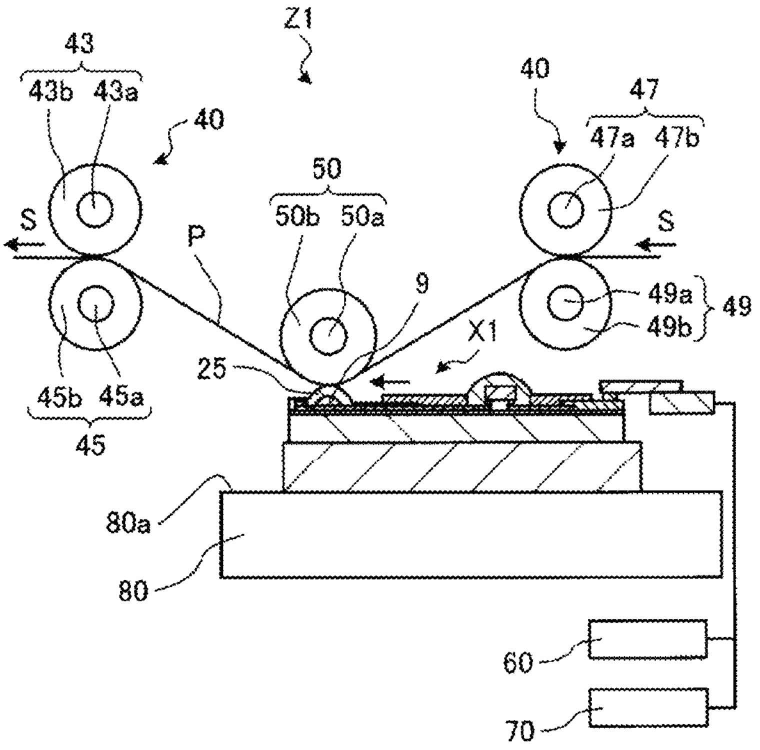
FIG. 5 is a view schematically illustrating a thermal printer.

As illustrated in FIG. 5, the thermal printer Z1 of the present embodiment includes the above-described thermal head X1, a transport mechanism 40, a platen roller 50, a power supply device 60, and a control device 70. The thermal head X1 is attached to an attachment surface 80*a* of an attachment member 80 provided in a housing (not illustrated) of the thermal printer Z1. Note that the thermal head X1 is attached to the attachment member 80 so that an arrangement direction of the heat generating portions 9 is in the main scanning direction that is a direction orthogonal to a transport direction S of a recording medium P described below.

The transport mechanism 40 includes a drive unit (not illustrated) and transport rollers 43, 45, 47, and 49. The transport mechanism 40 transports the recording medium P, such as heat-sensitive paper or image-receiving paper to which ink is to be transferred, in the transport direction S indicated by an arrow in FIG. 5, and transports the recording medium P onto the protective layer 25 located on the plurality of heat generating portions 9 of the thermal head X1. The drive unit has a function of driving the transport rollers 43, 45, 47, and 49, and can use, for example, a motor. The transport rollers 43, 45, 47, and 49 can be configured by, for example, covering cylindrical shaft bodies 43*a*, 45*a*, 47*a*, and 49*a* made of a metal such as stainless steel or the like, with elastic members 43*b*, 45*b*, 47*b*, and 49*b* made of butadiene rubber or the like. Note that, although not illustrated in the drawings, in a case where the recording medium P is the image-receiving paper or the like to which ink is to be transferred, together with the recording medium P, an ink film is transported between the recording medium P and the heat generating portions 9 of the thermal head X1.

The platen roller 50 has a function of pressing the recording medium P onto the protective layer 25 located on the heat generating portions 9 of the thermal head X1. The platen roller 50 is disposed so as to extend in a direction orthogonal to the transport direction S of the recording medium P, and both end portions are supported and fixed to be rotatable in a state in which the recording medium P is pressed onto the heat generating portions 9. The platen roller 50 can be configured, for example, by covering a cylindrical shaft body 50*a* made of a metal such as stainless steel, or the like, with an elastic member 50*b* made of butadiene rubber or the like.

As described above, the power supply device 60 has a function of supplying a current for causing the heat generating portions 9 of the thermal head X1 to generate heat and a current for operating the drive ICs 11. As described above, the control device 70 has a function of supplying a control signal for controlling the operation of the drive ICs 11, to the drive ICs 11 in order to selectively cause the heat generating portions 9 of the thermal head X1 to generate heat.

As illustrated in FIG. 5, the thermal printer Z1 performs predetermined printing on the recording medium P by selectively causing the heat generating portions 9 to generate heat by the power supply device 60 and the control device 70, while the recording medium P is pressed onto the heat generating portions 9 of the thermal head X1 by the platen roller 50, and the recording medium P is transported onto the heat generating portions 9 by the transport mechanism 40. Note that, in a case where the recording medium P is an image-receiving paper or the like, printing is performed on the recording medium P by thermally transferring an ink of the ink film (not illustrated) transported together with the recording medium P, to the recording medium P.

Figure 6:
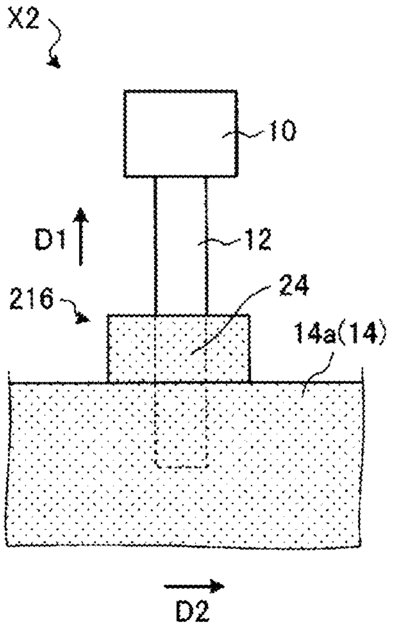
FIG. 6 is a plan view illustrating a thermal head according to another embodiment, and corresponding to FIG. 4.

A thermal head X2 according to another embodiment will be described with reference to FIG. 6. Note that members that are the same as those of the thermal head X1 are denoted by the same reference signs, and descriptions of similar configurations will be omitted.

The width of a protruding portion 216 is greater than the width of the first electrode 12 in plan view. As a result, the protruding portion 216 is located on the first electrode 12, and is also located to cover side surfaces, which face the main scanning direction, of the first electrode 12. In other words, the protruding portion 216 is located on an upper surface of the first electrode 12 and on the side surfaces, which face the main scanning direction, of the first electrode 12. The protruding portion 216 is in contact with the upper surface of the first electrode 12 and side surfaces, which face the main scanning direction, of the first electrode 12.

The protruding portion 216 overlaps with the first electrode 12 while being in contact with the first electrode 12. Here, "the protruding portion 216 overlaps with the first electrode 12" means that the protruding portion 216 is located on the surface of the first electrode 12. In other words, the thermal head X2 includes an overlapping region 24 in which the first electrode 12 and the protruding portion 216 overlap with each other in plan view.

In the thermal head X2, the protruding portion 216 is in contact with the upper surface and side surfaces of the first electrode 12 in the overlapping region 24. According to such a configuration, the contact surface area between the first electrode 12 and the second electrode 14 is increased by an amount corresponding to the side surfaces of the first electrode 12. In addition, the cross-sectional area of the entirety of the electrodes is increased by an amount corresponding to the protruding portions 216. As a result, the wiring resistance between the first electrode 12 and the second electrode 14 is reduced and the efficiency of the thermal head X2 is improved.

The width of the protruding portion 216 may be greater than the width of the electrode pad 10. According to such a configuration, even when a large position shift of the print mask occurs, the contact surface area between the protruding portion 216 and the first electrode 12 can be easily maintained at a predetermined size. As a result, a variation in the wiring resistance is less likely to occur in each of the plurality of first electrodes 12.

Figure 7:
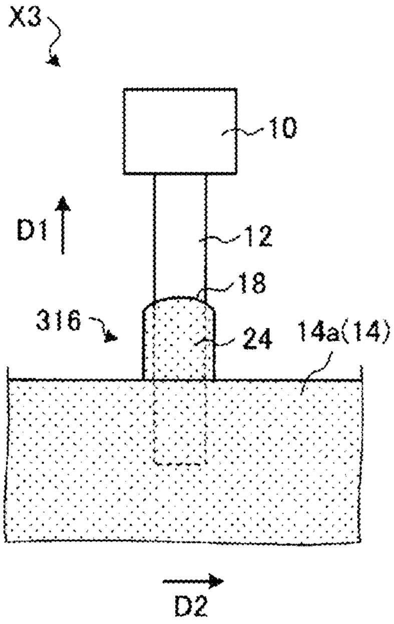
FIG. 7 is a plan view illustrating a thermal head according to another embodiment, and corresponding to FIG. 4.

A thermal head X3 according to another embodiment will be described with reference to FIG. 7.

A protruding portion 316 has a tip 18 with a curved shape in a first direction D1 in plan view. More specifically, the protruding portion 316 has side surfaces in the main scanning direction in plan view, the tip 18 protrudes from the side surfaces toward the electrode pad 10, and the tip 18 forms a curved line.

In the thermal head X3, the tip 18 has a curved shape in the first direction D1 in plan view. According to such a configuration, stress generated in the protruding portion 316 can be reduced, and, consequently, the protruding portion 316 is less likely to peel from the first electrode 12.

In particular, in a case where the thickness of the first electrode 12 formed earlier is small and the thickness of the second electrode 14 formed later is large, stress may be generated in the tip 18 of the protruding portion 316 when the second electrode 14 is formed, and cracks may occur at the interface between the first electrode 12 and the second electrode 14, which may cause disconnection. However, since the tip 18 of the protruding portion 316 has a curved shape in plan view, the generated stress can be alleviated.

Note that in the thermal head X3, an example has been given in which the tip 18 of the protruding portion 316 has a convex curved shape in plan view; however, the shape is not necessarily a convex curved shape. For example, the tip 18 of the protruding portion 316 may have a concave curved shape in plan view. Also, in such a case, stress generated near the tip 18 can be alleviated.

Figure 8:
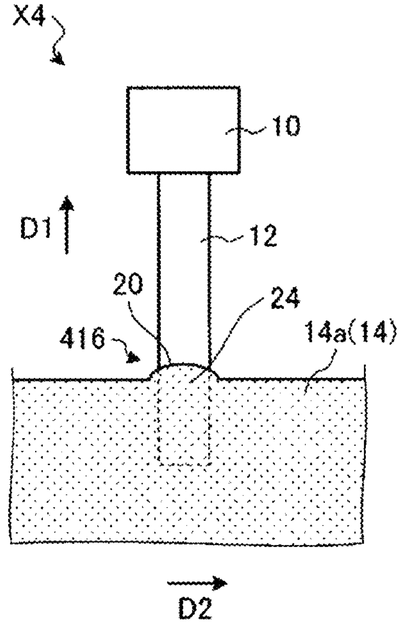
FIG. 8 is a plan view illustrating a thermal head according to another embodiment, and corresponding to FIG. 4.

A thermal head X4 according to another embodiment will be described with reference to FIG. 8.

The protruding portion 416 has an outline 20 of a protruding part that is convex-curve-shaped in plan view. In other words, the protruding portion 416, which is a part protruding from the first section 14*a*, has the outline 20 that is circular-arc-shaped in plan view.

In the thermal head X4, the protruding portion 416 has the outline 20 of a protruding part that is convex-curve-shaped in plan view. According to such a configuration, stress generated in the protruding portion 416 can be further reduced, and, consequently, the protruding portion 416 is less likely to peel from the first electrode 12. As a result, the thermal head X4 is less likely to break. In particular, when the thickness of the first electrode 12 is 3 to 20 μm, a step is generated due to the thickness of the first electrode 12. In the protruding portion 416, the stress generated in the vicinity of the step can be alleviated.

In addition, by comparing the positional relationships between the protruding portion 416 and the first electrode 12 for each of the first electrodes 12, a position shift of the print mask can be detected.

The width of the protruding portion 416 is greater than the width of the first electrode 12. As a result, even when the protruding portion 416 has the outline 20 of a protruding part that is convex-curve-shaped in plan view, an overlapping region 24 where the first electrode 12 and the protruding portion 416 overlap with each other can be ensured.

Figure 9:
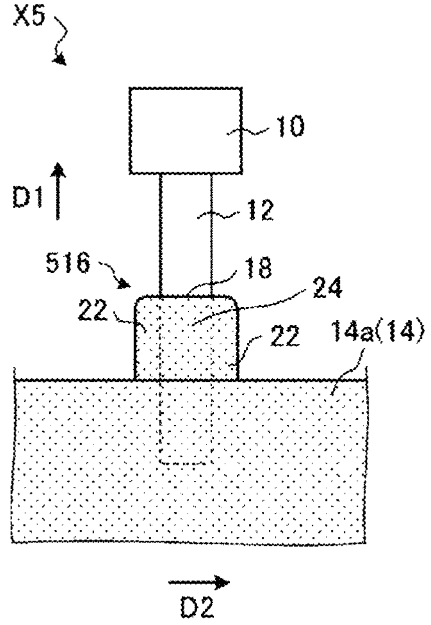
FIG. 9 is a plan view illustrating a thermal head according to another embodiment, and corresponding to FIG. 4.

A thermal head X5 according to another embodiment will be described with reference to FIG. 9.

A protruding portion 516 is in contact with the upper surface and side surfaces of the first electrode 12 in an overlapping region 24 where the first electrode 12 and the protruding portion 516 overlap with each other. The protruding portion 516 includes extending portions 22 that extend in the second direction D2, on two sides of the overlapping region 24. In other words, the protruding portion 516 includes portions located outward from the overlapping region 24 in the second direction D2.

According to such a configuration, the thermal head X5 is less affected by a position shift of the print mask.

In other words, even when the protruding portion 516 is shifted in the second direction D2 due to a position shift of the print mask, since the protruding portion 516 includes the extending portions 22, the contact surface area between the protruding portion 516 and the first electrode 12 can be easily maintained at a predetermined size. As a result, a variation in the wiring resistance is less likely to occur in each of the plurality of first electrodes 12.

The protruding portion 516 has corner portions that have an R shape in the first direction D1. According to such a configuration, stress can be alleviated by the R shape.

In the protruding portion 516, the tip 18 located on the first electrode 12 extends along the second direction D2. As a result, even when the protruding portion 516 is shifted in the second direction D2 due to a position shift of the print mask, the area of the overlapping region 24 where the protruding portion 516 and the first electrode 12 overlap with each other can be easily maintained to be constant. As a result, a variation in the wiring resistance is less likely to occur in each of the plurality of first electrodes 12. Note that the tip 18 need not be parallel to the second direction D2 in plan view. The tip 18 may be inclined by ±5° with respect to the second direction D2.

Figure 10:
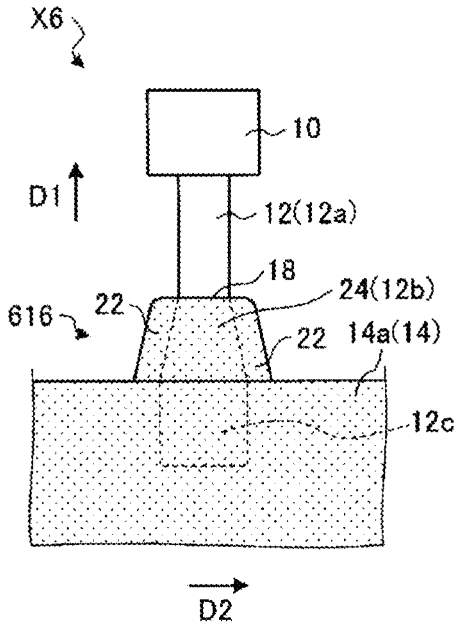
FIG. 10 is a plan view illustrating a thermal head according to another embodiment, and corresponding to FIG. 4.

A thermal head X6 according to another embodiment will be described with reference to FIG. 10.

A protruding portion 616 is in contact with the upper surface and side surfaces of the first electrode 12 in an overlapping region 24 where the first electrode 12 and the protruding portion 616 overlap with each other. The protruding portion 616 includes extending portions 22 that extend in the second direction D2, on both sides of the overlapping region 24. In other words, the protruding portion 616 includes portions located outward from the overlapping region 24 in the second direction D2.

According to such a configuration, the thermal head X6 is less affected by a position shift of the print mask.

In other words, even when the protruding portions 616 are shifted in the second direction D2 due to a position shift of the print mask, since the protruding portion 616 includes the extending portions 22, the contact surface area between the protruding portion 616 and the first electrode 12 can be easily maintained at a predetermined size. As a result, a variation in the wiring resistance is less likely to occur in each of the plurality of first electrodes 12.

The protruding portion 616 has corner portions that have an R shape in the first direction D1. According to such a configuration, stress can be alleviated by the R shape.

In the protruding portion 616, the tip 18 located on the first electrode 12 is in the second direction D2. As a result, even when the protruding portion 616 is shifted in the second direction D2 due to a position shift of the print mask, the area of the overlapping region 24 where the protruding portion 616 and the first electrode 12 overlap with each other can be easily maintained to be constant. As a result, a variation in the wiring resistance is less likely to occur in each of the plurality of first electrodes 12. Note that the tip 18 need not be parallel to the second direction D2 in plan view. The tip 18 may be inclined by ±5° with respect to the second direction D2.

In the thermal head X6, the first electrode 12 includes, in order from the electrode pad 10 side that is in direct contact with the first electrode 12, a base end portion 12*a*, a first overlapping portion 12*b*, and a second overlapping portion 12*c*. The base end portion 12*a* is a site that extends between the electrode pad 10 and the protruding portion 616. The first overlapping portion 12*b* is a site that overlaps with the protruding portion 616 of the second electrode 14. The second overlapping portion 12*c* is a site that overlaps with the first section 14*a* of the second electrode 14.

In the thermal head X6, the first overlapping portion 12*b* of the first electrode 12 has a tapered shape. In other words, in the thermal head X6, the first electrode 12 is formed so that the width of the first overlapping portion 12*b* increases toward the second overlapping portion 12*c*.

According to such a configuration, the contact surface area between the first electrode 12 and the second electrode 14 is increased by an amount corresponding to the tapered shape. In addition, the cross-sectional area of the entirety of the electrodes is increased by an amount corresponding to the protruding portions 616. As a result, the wiring resistance of the thermal head X6 is reduced and the efficiency of the thermal head X6 is improved.

In addition, in the thermal head X6, the protruding portion 616 also has a tapered shape so as to follow the first overlapping portion 12*b* of the first electrode 12 having the tapered shape. As a result, even when the protruding portion 616 is shifted in the second direction D2 due to a position shift of the print mask, the area of the overlapping region 24 where the protruding portion 616 and the first electrode 12 overlap with each other can be easily maintained to be constant. As a result, a variation in the wiring resistance is less likely to occur in each of the plurality of first electrodes 12.

Figure 11:
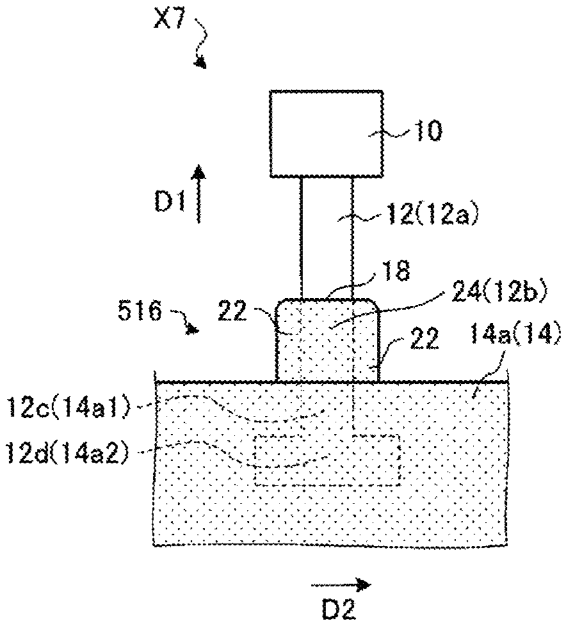
FIG. 11 is a plan view illustrating a thermal head according to another embodiment, and corresponding to FIG. 4.

A thermal head X7 according to another embodiment will be described with reference to FIG. 11.

The protruding portion 516 has a similar configuration and effect to those of the protruding portion 516 of the thermal head X5 described above, and thus detailed description thereof will be omitted.

In the thermal head X7, the first electrode 12 includes a base end portion 12*a*, a first overlapping portion 12*b*, a second overlapping portion 12*c*, and a third overlapping portion 12*d* in order from the electrode pad 10 side. The base end portion 12*a* is a site that extends between the electrode pad 10 and the protruding portion 516. The first overlapping portion 12*b* is a site that overlaps with the protruding portion 516 of the second electrode 14. The second overlapping portion 12*c* is a site in which the width is substantially equal to those of the base end portion 12*a* and the first overlapping portion 12*b*, in a site overlapping with the first section 14*a* of the second electrode 14. The third overlapping portion 12*d* is a site in which the width is wider than those of the base end portion 12*a* and the first overlapping portion 12*b*, in the site overlapping with the first section 14*a* of the second electrode 14. In other words, in the thermal head X7, the third overlapping portion 12*d* is wider than the base end portion 12*a*, the first overlapping portion 12*b*, and the second overlapping portion 12*c*.

According to such a configuration, the contact surface area between the first electrode 12 and the second electrode 14 is increased by an amount corresponding to the large width of the third overlapping portion 12*d* of the first electrode 12. In addition, the cross-sectional area of the entirety of the electrodes is increased by an amount corresponding to the protruding portions 516. As a result, the wiring resistance between the first electrode 12 and the second electrode 14 is reduced. As a result, the wiring resistance of the thermal head X7 is reduced and the efficiency of the thermal head X7 is improved.

Furthermore, in the thermal head X7, the film thickness of a first section 14*a*1 of the second electrode 14 that overlaps with the second overlapping portion 12*c* of the first electrode 12 is greater than the film thickness of the protruding portion 516 of the second electrode 14 that overlaps with the first overlapping portion 12*b* of the first electrode 12. Furthermore, in the thermal head X7, the film thickness of a first section 14*a*2 of the second electrode 14 that overlaps with the third overlapping portion 12*d* of the first electrode 12 is greater than the film thickness of the first section 14*a*1 of the second electrode 14 that overlaps with the second overlapping portion 12*c* of the first electrode 12. In other words, in the thermal head X7, the film thickness of the second electrode 14 is gradually increased toward the protruding portion 516, the first section 14*a*1, and the first section 14*a*2.

According to such a configuration, step stress generated by the large film thickness of the second electrode 14 at the protruding portion 516 and the first section 14*a*1 can be suppressed. As a result, the reliability of the thermal head X7 is improved.

Note that, as a technique for gradually increasing the film thickness of the second electrode 14 toward the protruding portion 516, the first section 14*a*1, and the first section 14*a*2, it is only required, for example, that screen printing be repeatedly performed at a position corresponding to the first section 14*a*1 and the first section 14*a*2 in forming the second electrode 14 by screen printing.

Figure 12:
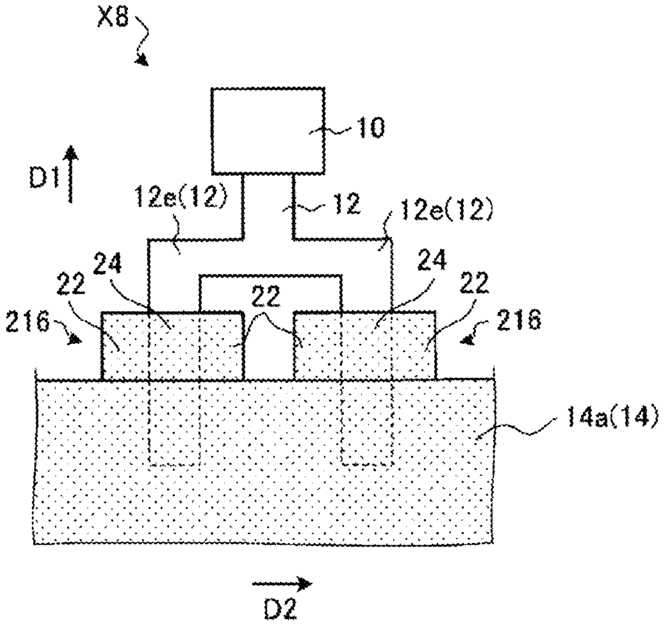
FIG. 12 is a plan view illustrating a thermal head according to another embodiment, and corresponding to FIG. 4.

A thermal head X8 according to another embodiment will be described with reference to FIG. 12.

In the thermal head X8, the first electrode 12 includes a plurality of (two in the drawing) branch portions 12*e*. In the thermal head X8, the first electrode 12 is in contact with the electrode pad 10 at one location, and is separately in contact with the second electrode 14 at a plurality of locations (two locations in the drawing). Note that, in the thermal head X8, the plurality of branch portions 12*e* are branched so as to extend in the second direction D2, and the plurality of branch portions 12*e* spaced apart from each other each extend to the second electrode 14 in the first direction D1.

The plurality of branch portions 12*e* extend to the first section 14*a* of the second electrode 14 while overlapping with the plurality of (two in the drawing) protruding portions 216 provided on the second electrode 14. Note that the protruding portions 216 have a similar configuration and effect to those of the protruding portion 216 of the thermal head X2 described above, and thus detailed description thereof will be omitted.

According to such a configuration, the contact surface area between the first electrode 12 and the second electrode 14 is increased by an amount corresponding to the amount of contact with the second electrode 14 at each of the plurality of branch portions 12*e*. In addition, the cross-sectional area of the entirety of the electrodes is increased by an amount corresponding to the protruding portions 216. As a result, the wiring resistance between the first electrode 12 and the second electrode 14 is reduced. As a result, the wiring resistance of the thermal head X8 is reduced and the efficiency of the thermal head X8 is improved.

According to such a configuration, even in a case where one of the plurality of branch portions 12*e* is disconnected, electrical connection between the electrode pad 10 and the second electrode 14 can be ensured by the other of the plurality of branch portions 12*e*. As a result, the reliability of the thermal head X8 is improved.

Figure 13:
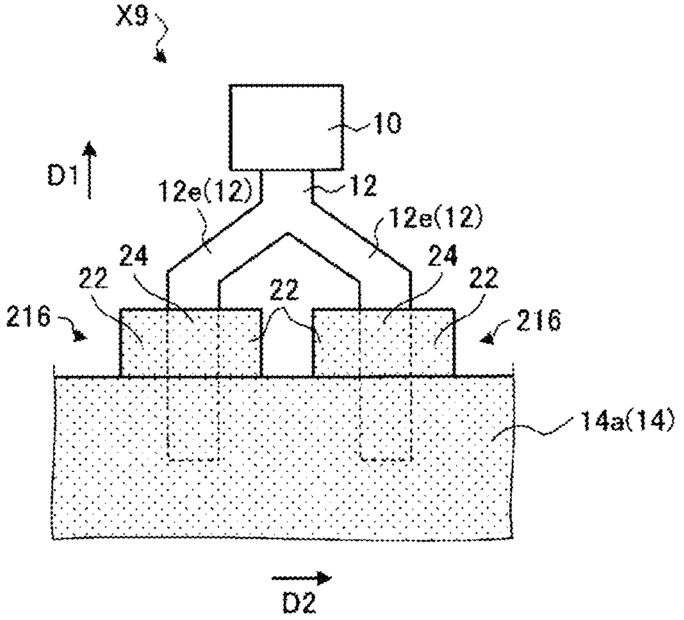
FIG. 13 is a plan view illustrating a thermal head according to another embodiment, and corresponding to FIG. 4.

A thermal head X9 according to another embodiment will be described with reference to FIG. 13.

The thermal head X9 is similar to the thermal head X8 in that, the first electrode 12 includes the plurality of (two in the drawing) branch portions 12*e*. In contrast, in the thermal head X9, the plurality of branch portions 12*e* are branched while being inclined with respect to the second direction D2 so as to be spaced apart from each other, and the plurality of branch portions 12*e* spaced apart from each other each extend to the second electrode 14 in the first direction D1.

The plurality of branch portions 12*e* extend to the first section 14*a* of the second electrode 14 while overlapping with the plurality of (two in the drawing) protruding portions 216 provided on the second electrode 14. Note that the protruding portions 216 have a similar configuration and effect to those of the protruding portion 216 of the thermal head X2 described above, and thus detailed description thereof will be omitted.

According to such a configuration, the contact surface area between the first electrode 12 and the second electrode 14 is increased by an amount corresponding to the amount of contact with the second electrode 14 at each of the plurality of branch portions 12*e*. In addition, the cross-sectional area of the entirety of the electrodes is increased by an amount corresponding to the protruding portions 216. As a result, the wiring resistance between the first electrode 12 and the second electrode 14 is reduced. As a result, the wiring resistance of the thermal head X9 is reduced and the efficiency of the thermal head X9 is improved.

According to such a configuration, even in a case where one of the plurality of branch portions 12*e* is disconnected, electrical connection between the electrode pad 10 and the second electrode 14 can be ensured by the other of the plurality of branch portions 12*e*. As a result, the reliability of the thermal head X9 is improved.

Furthermore, since the plurality of branch portions 12*e* are branched in an oblique pattern, stress at a branching site in the first electrode 12 can be alleviated. As a result, the reliability of the thermal head X9 is improved. In addition, since the plurality of branch portions 12*e* are branched in the oblique pattern, the first electrode 12 can be easily formed by screen printing.

Note that in the thermal heads X8 and X9, examples are given in which two branch portions 12*e* are provided in one first electrode 12; however, three or more branch portions 12*e* may be provided in one first electrode 12. According to such a configuration, even in a case where a plurality of branch portions 12*e* are disconnected, electrical connection between the electrode pad 10 and the second electrode 14 can be ensured by the remaining branch portions 12*e*. As a result, the reliability of the thermal heads X8 and X9 is further improved.

Figure 14:
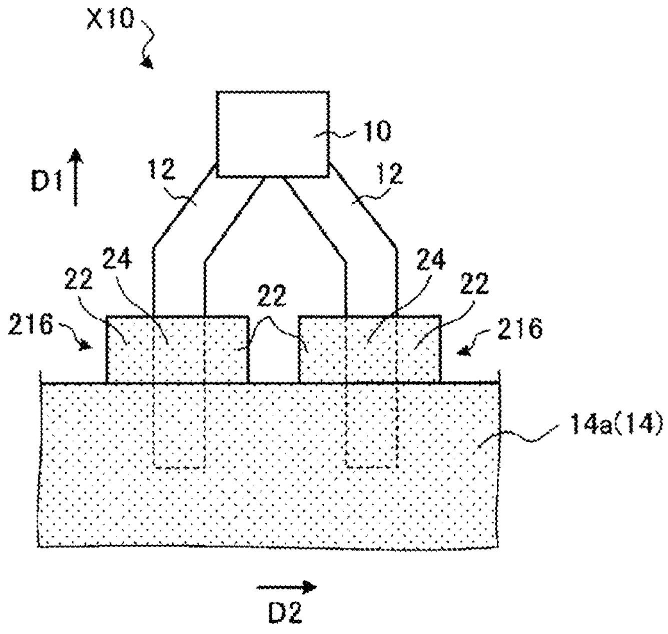
FIG. 14 is a plan view illustrating a thermal head according to another embodiment, and corresponding to FIG. 4.

A thermal head X10 according to another embodiment will be described with reference to FIG. 14.

In the thermal head X10, a plurality of (two in the drawing) first electrodes 12 are in contact with one electrode pad 10. In the thermal head X10, the plurality of first electrodes 12 are spaced apart from each other while being inclined with respect to the second direction D2 so as to be spaced apart from each other, and the plurality of first electrodes 12 spaced apart from each other each extend to the second electrode 14 in the first direction D1.

The plurality of first electrodes 12 extend to the first section 14*a* of the second electrode 14 while overlapping with a plurality of (two in the drawing) protruding portions 216 provided on the second electrode 14. Note that the protruding portions 216 have a similar configuration and effect to those of the protruding portion 216 of the thermal head X2 described above, and thus detailed description thereof will be omitted.

According to such a configuration, the contact surface area between the first electrodes 12 and the second electrode 14 is increased by an amount corresponding to the amount of contact with the second electrode 14 at each of the plurality of first electrodes 12. In addition, the cross-sectional area of the entirety of the electrodes is increased by an amount corresponding to the protruding portions 216. As a result, the wiring resistance between the first electrode 12 and the second electrode 14 is reduced. As a result, the wiring resistance of the thermal head X10 is reduced and the efficiency of the thermal head X10 is improved.

According to such a configuration, even in a case where one of the plurality of first electrodes 12 is disconnected, electrical connection between the electrode pad 10 and the second electrode 14 can be ensured by the other of the plurality of first electrodes 12. As a result, the reliability of the thermal head X10 is improved.

Note that, in the thermal head X10, an example is given in which two first electrodes 12 are provided for one electrode pad 10; however, three or more first electrodes 12 may be provided for one electrode pad 10. According to such a configuration, even in a case where a plurality of first electrodes 12 are disconnected, electrical connection between the electrode pad 10 and the second electrode 14 can be ensured by the remaining first electrodes 12. As a result, the reliability of the thermal head X10 is further improved.

Figure 15:
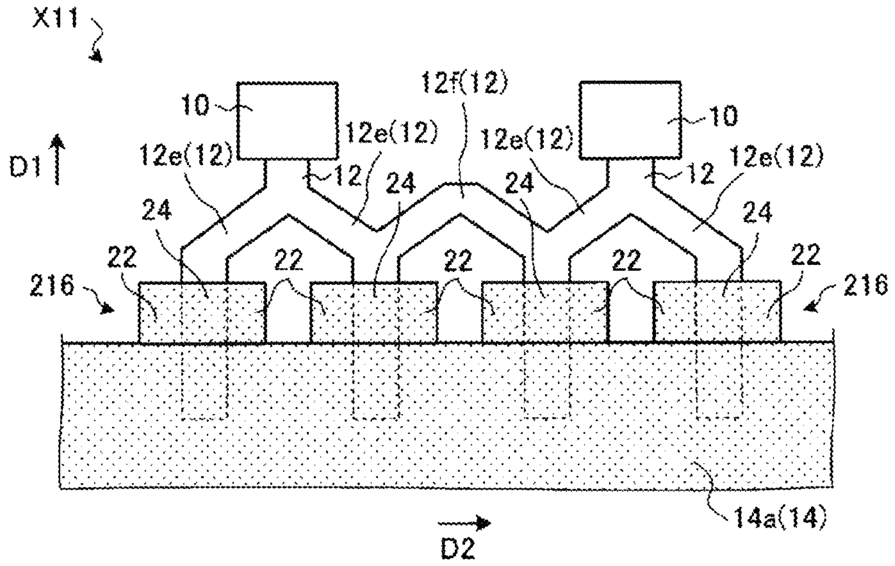
FIG. 15 is a plan view illustrating a thermal head according to another embodiment, and corresponding to FIG. 4.

A thermal head X11 according to another embodiment will be described with reference to FIG. 15.

In the thermal head X11, the first electrode 12 includes a plurality of (two in the drawing) branch portions 12*e*. The plurality of branch portions 12*e* are branched while being inclined with respect to the second direction D2 so as to be spaced apart from each other, and the plurality of branch portions 12*e* spaced apart from each other each extend to the second electrode 14 in the first direction D1.

In the thermal head X11, the plurality of branch portions 12*e* extend to the first section 14*a* of the second electrode 14 while overlapping with a plurality of (two in the drawing) protruding portions 216 provided on the second electrode 14. Note that the protruding portions 216 have a similar configuration and effect to those of the protruding portion 216 of the thermal head X2 described above, and thus detailed description thereof will be omitted.

In the thermal head X11, the plurality of branch portions 12*e* of the first electrodes 12 connected to corresponding adjacent ones of the electrode pads 10 are electrically connected to each other via a connection portion 12*f*.

According to such a configuration, even in a case where the first electrode 12 in contact with one of the electrode pads 10 is disconnected, electrical connection between the electrode pad 10 and the second electrode 14 can be ensured by the first electrode 12 in contact with the other of the electrode pads 10. As a result, the reliability of the thermal head X11 is improved.

One embodiment according to the present invention has been described. However, the present invention is not limited to the embodiment described above, and various modifications can be made without departing from the essential spirit of the present invention. For example, the thermal printer Z1 using the thermal head X1, which is the first embodiment, is described. However, the present embodiment is not limited thereto, and thermal heads X2 to X11 may be used in the thermal printer Z1. In addition, the thermal heads X1 to X11, which are the plurality of embodiments, may be combined.

The example in which the heat generating portions 9 are formed on the main surface of the substrate 7 is illustrated. However, the present invention can also be implemented in an end surface type thermal head in which the heat generating portions 9 are formed on the end surface of the substrate 7.

Furthermore, description was made for the case of a thick film head including the heat generating resistor 15 formed by printing. However, the present embodiment is not limited to a thick film head. A thin film head including the heat generating resistor 15 formed by sputtering may alternatively be used.

The connector 31 may be directly electrically connected to the head base 3 without providing the FPC 5. In this case, a connector pin (not illustrated) of the connector 31 and the electrode pad 10 may be electrically connected.

REFERENCE SIGNS LIST

X1 to X11 Thermal head
Z1 Thermal printer
1 Heat dissipation body
3 Head base
5 Flexible printed circuit board
7 Substrate
9 Heat generating portion
10 Electrode pad
11 Drive IC
12 First electrode
12*a* Base end portion
12*b* First overlapping portion
12*c* Second overlapping portion
12*d* Third overlapping portion
12*e* Branch portion
12*f* Connection portion
13 Heat storage layer
14 Second electrode
14*a* First section
15 Heat generating resistor
16, 216, 316, 416, 516, 616 Protruding portion
17 Common electrode
18 Tip
19 Individual electrode
20 Outline
22 Extending portion
24 Overlapping region
25 Protective layer
27 Cover layer
29 Cover member
D1 First direction
D2 Second direction

The invention claimed is:

1. A thermal head, comprising:
a substrate;
a plurality of heat generating portions located on the substrate;
a plurality of individual electrodes located on the substrate and respectively connected to the plurality of heat generating portions;
drive ICs located on the substrate, connected to the plurality of individual electrodes, and configured to control driving of the plurality of heat generating portions;
a plurality of first electrodes located on the substrate and respectively connected, via the plurality of individual electrodes and the drive ICs, to the plurality of heat generating portions; and
a second electrode located on the substrate and located across the plurality of first electrodes, wherein
the second electrode comprises protruding portions protruding in a first direction from the second electrode toward corresponding ones of the plurality of first electrodes and being in contact with the corresponding ones of the plurality of first electrodes.

2. The thermal head according to claim 1, wherein
the protruding portions are in contact with an upper surface and side surfaces of corresponding ones of the plurality of first electrodes in overlapping regions where the plurality of first electrodes and the protruding portions respectively overlap with each other.

3. The thermal head according to claim 1, wherein
each of the protruding portions has a tip shape that is curved in the first direction in plan view.

4. The thermal head according to claim 1, wherein
each of the protruding portions has an outline of a protruding part that is convex-curve-shaped in plan view.

5. The thermal head according to claim 1, wherein
each of the protruding portions comprises an extending portion extending in a second direction on both sides of overlapping regions where the plurality of first electrodes and the protruding portions respectively overlap with each other, and
the second direction is a direction in which the second electrode extends.

6. The thermal head according to claim 1, wherein
each of the plurality of first electrodes has a tapered shape in overlapping regions where the plurality of first electrodes and the protruding portions respectively overlap with each other.

7. The thermal head according to claim 1, wherein
the second electrode comprises a first section located across the plurality of first electrodes,
each of the plurality of first electrodes comprises, in order from a side with an electrode pad in direct contact with the first electrode,
a base end portion extending between the electrode pad and a corresponding one of the protruding portions,
a first overlapping portion overlapping with the corresponding one of the protruding portions, and
a second overlapping portion and third overlapping portion overlapping with the first section, and
the third overlapping portion is wider than the base end portion, the first overlapping portion, and the second overlapping portion.

8. The thermal head according to claim 7, wherein,
in the second electrode, a thickness of a portion overlapping with the second overlapping portion of each of the plurality of first electrodes is greater than a thickness of a corresponding one of the protruding portions, and
a thickness of a portion overlapping with the third overlapping portion of each of the plurality of first electrodes is greater than a thickness of a portion overlapping with the second overlapping portion of each of the plurality of first electrodes.

9. The thermal head according to claim 1, wherein
each of the plurality of first electrodes comprises a plurality of branch portions in contact with the second electrode.

10. The thermal head according to claim 9, wherein the plurality of branch portions is branched so as to be spaced apart from each other while extending in a second direction that is a direction in which the second electrode extends, and each of the plurality of branch portions extends to the second electrode in the first direction.

11. The thermal head according to claim 9, wherein the plurality of branch portions is branched to be spaced apart from each other while being inclined with respect to a second direction that is a direction in which the second electrode extends, and each of the plurality of branch portions extends to the second electrode in the first direction.

12. The thermal head according to claim 9, wherein the plurality of branch portions of each of the plurality of first electrodes in contact with respective adjacent electrode pads is electrically connected to each other via a connection portion.

13. The thermal head according to claim 1, wherein the plurality of first electrodes is in contact with one electrode pad.

14. The thermal head according to claim 1, further comprising:

a cover member configured to cover the drive ICs, wherein the plurality of first electrodes is respectively connected to the drive ICs, and an end portion of the protruding portions is spaced apart from the drive ICs in plan view.

15. A thermal printer, comprising:

the thermal head according to claim 1;

a transport mechanism configured to transport a recording medium to pass the recording medium over the plurality of heat generating portions; and a platen configured to press the recording medium.

16. A thermal head, comprising:

a substrate;

a plurality of heat generating portions located on the substrate;

a plurality of first electrodes located on the substrate and respectively connected to the plurality of heat generating portions; and a second electrode located on the substrate and located across the plurality of first electrodes, wherein the second electrode comprises protruding portions protruding in a first direction from the second electrode toward corresponding ones of the first electrodes and being in contact with the corresponding ones of the first electrodes, the second electrode comprises a first section located across the plurality of first electrodes, the plurality of first electrodes each comprise, in order from an electrode pad side in direct contact with the first electrode, a base end portion extending between the electrode pad and a corresponding one of the protruding portions, a first overlapping portion overlapping with the corresponding one of the protruding portions, and a second overlapping portion and third overlapping portion overlapping with the first section, and the third overlapping portion is wider than the base end portion, the first overlapping portion, and the second overlapping portion.

17. A thermal head, comprising:

a substrate;

a plurality of heat generating portions located on the substrate;

a plurality of first electrodes located on the substrate and respectively connected to the plurality of heat generating portions; and a second electrode located on the substrate and located across the plurality of first electrodes, wherein the second electrode comprises protruding portions protruding in a first direction from the second electrode toward corresponding ones of the first electrodes and being in contact with the corresponding ones of the first electrodes, and the first electrodes a plurality of branch portions, and are each in contact with the second electrode at the plurality of branch portions.

* * * * *